United States Patent
Aranda et al.

(10) Patent No.: US 6,930,686 B1
(45) Date of Patent: Aug. 16, 2005

(54) METHOD AND APPARATUS FOR DRAWING THICK GRAPHIC PRIMITIVES

(75) Inventors: Michael Archangel Aranda, Apex, NC (US); Thuy-Linh Tran Bui, Pflugerville, TX (US); James Bernard Keenan, III, Austin, TX (US); Tushar R. Patel, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 688 days.

(21) Appl. No.: 09/335,289

(22) Filed: Jun. 17, 1999

(51) Int. Cl.$^7$ .............................................. G09G 5/00
(52) U.S. Cl. ..................................................... 345/443
(58) Field of Search ............................... 345/443, 441, 345/470, 467, 469

(56) References Cited

U.S. PATENT DOCUMENTS

| | | | | |
|---|---|---|---|---|
| 5,487,142 A | * | 1/1996 | Nakayama et al. | 345/443 |
| 5,831,635 A | * | 11/1998 | Nakamura | 345/443 |
| 5,867,172 A | * | 2/1999 | Fujisawa et al. | 345/467 |
| 5,903,279 A | * | 5/1999 | Lee et al. | 345/443 |
| 6,130,667 A | * | 10/2000 | Hasegawa et al. | 345/194 |
| 6,215,504 B1 | * | 4/2001 | Longhenry et al. | 345/443 |
| 6,266,444 B1 | * | 7/2001 | Yoshida | 382/202 |
| 6,297,828 B1 | * | 10/2001 | Fukuzawa | 345/443 |
| 6,304,274 B1 | * | 10/2001 | Brokenshire | 345/443 |

OTHER PUBLICATIONS

James D. Foley, Andries Van Dam, Steven K. Feiner, John F. Hughes; Computer Graphics (Principles & Practice); Addison–Wesley Publishing Company (2d Ed. in C, 1996).

* cited by examiner

Primary Examiner—Sumati Lefkowitz
Assistant Examiner—Motilewa Good-Johnson
(74) Attorney, Agent, or Firm—Joseph P. Lally; Mark E. McBurney

(57) ABSTRACT

A graphics system and method with which thick graphic primitives are efficiently drawn by minimizing dependence on drawing algorithms that require appreciable setup time. The method contemplates drawing a thick primitive in which an offset or displacement value is first calculated, based upon the thickness of the graphic primitive. The offset is approximately one half of the thickness of the primitive. Following calculation of the offset value, line drawing parameter values are determined for a line that is parallel to the origin line and displaced from the origin line in a minor axis direction by the displacement or offset value. A loop is then repeated for each grip point in the major axis range of the line. The loop includes an initial step in which a boundary pixel of the thick graphic primitive is drawn using the line drawing algorithm and the line drawing parameter values calculated for the offset line. After the boundary pixel has been drawn, one or more adjacent pixels are drawn using a stepping routine in which the mirror axis coordinate of the selected pixel is either decremented or incremented, depending upon the slope of the line, to write the pixels adjacent the boundary pixel. In this fashion, the present invention draws a thick primitive as a sequence of segments that are parallel to the minor axis of the origin line. In the preferred embodiment, the line drawing routine is preferably comprised of a Bresenham line drawing algorithm or a similar derivative algorithm. In the preferred embodiment, the displacement D is equal to FLOOR((W−1)/2), where W is the thickness of the primitive and FLOOR(X) is the integer portion of X.

17 Claims, 2 Drawing Sheets

METHOD AND APPARATUS FOR DRAWING THICK GRAPHIC PRIMITIVES

BACKGROUND

1. Field of the Present Invention

The present invention generally relates to the field of computer graphics and more particularly to rendering thick primitives such as lines in an efficient manner.

2. History of Related Art

Graphics display subsystems are almost universally encountered in microprocessor based computer systems to facilitate a variety of graphics tasks and applications. Graphics processors, graphics adapters, and a variety of similarly designed computer products provide specialized hardware to speed the execution of graphics instructions and rendering of graphic images. These processors and adapters typically include, for example, circuitry optimized for translating, rotating, and scaling graphic images. In a typical application, a graphical image that is displayed on a display terminal or other output device is composed of one or more graphic primitives. For purposes of this disclosure, a graphic primitive may be thought of as one or more points, lines, or polygons that are associated with one another, such as by being connected to one another. Typically, the displayed image is generated by creating one or more graphic primitives, assigning various attributes to the graphic primitives, defining a viewing point and a viewing field, determining which of the graphic primitives are within the defined viewing field, and rendering those graphic primitives as they would appear from the viewing point. This process can require a tremendous amount of computing power to keep pace with increasingly complex and commercially available graphics applications. Accordingly, designers of graphics systems and graphics applications are continuously seeking cost effective means for improving the efficiency at which graphic images are rendered and displayed.

SUMMARY OF THE INVENTION

The present invention provides a graphics system and method with which thick graphic primitives are efficiently drawn by minimizing dependence on drawing algorithms that require appreciable setup time. Broadly speaking, the present invention contemplates a method of drawing a thick primitive in which an offset or displacement value is first calculated based upon the thickness of the graphic primitive. In one presently preferred embodiment, the offset is approximately one half of the thickness of the primitive. Following calculation of the offset value, line drawing parameter values are determined for a line that is parallel to the origin line and displaced from the origin line in a minor axis direction by the displacement or offset value. A loop is then repeated for each grip point in the major axis range of the line. The loop includes an initial step in which a boundary pixel of the thick graphic primitive is drawn using the line drawing algorithm and the line drawing parameter values calculated for the offset line. After the boundary pixel has been drawn, one or more adjacent pixels are drawn using a stepping routine in which the minor axis coordinate of the selected pixel is either decremented or incremented, depending upon the slope of the line, to write the pixels adjacent the boundary pixel. In this fashion, the present invention draws a thick primitive as a sequence of segments that are parallel to the minor axis of the origin line. Because line parameters are calculated for only a single line using the present invention, the setup time required to initiate the drawing of the thick primitive is achieved with a minimum of overhead.

In the preferred embodiment, the line drawing routine is preferably comprised of a Bresenham line drawing algorithm or a derivative thereof. In one embodiment, the offset or displacement calculated for use in drawing the boundary pixels of the thick primitive is a function of the thickness of the primitive. In the preferred embodiment, the displacement D is equal to FLOOR((W−1)/2), where W is the thickness of the primitive and FLOOR(X) is equal to the integer portion of X, such that the thick primitive lies approximately equally on either side of the origin line.

The present invention still further contemplates a graphic display system including one or more central processing units (CPUs) coupled to a system memory and a graphics adapter via a system or local bus. The video controller preferably updates the display screen with an image indicative of the contents of the frame buffer. In the preferred embodiment, the graphics adapter includes dedicated and optimized circuitry or hardware or storage means configured with instructions for drawing a thick primitive such as a thick line by invoking a line drawing algorithm for a first or boundary pixel of a graphic primitive, drawing a set of pixels adjacent to the boundary pixel using a step routine that increments or decrements a minor axis grid point coordinate and draws a pixel at the new location.

The present invention still further contemplates a graphics adapter including means for invoking a line drawing algorithm at a major axis pixel coordinate to determine a first minor axis pixel coordinate and for selecting a first pixel defined by the major and minor axis coordinates. The adapter further includes means for invoking a stepping routine to select at least one additional pixel that shares a common major axis pixel coordinate with the first pixel. The first pixel and the at least one additional pixel comprise one of a plurality of segments of a thick line. The line drawing algorithm invoked by the preferred embodiment of the adapter is a midpoint line algorithm. The first minor axis pixel coordinate preferably corresponds to an offset line that is displaced from and parallel to the center line of the thick primitive.

BRIEF DESCRIPTION OF THE DRAWINGS

Other objects and advantages of the invention will become apparent upon reading the following detailed description and upon reference to the accompanying drawings in which.

Figure 1:
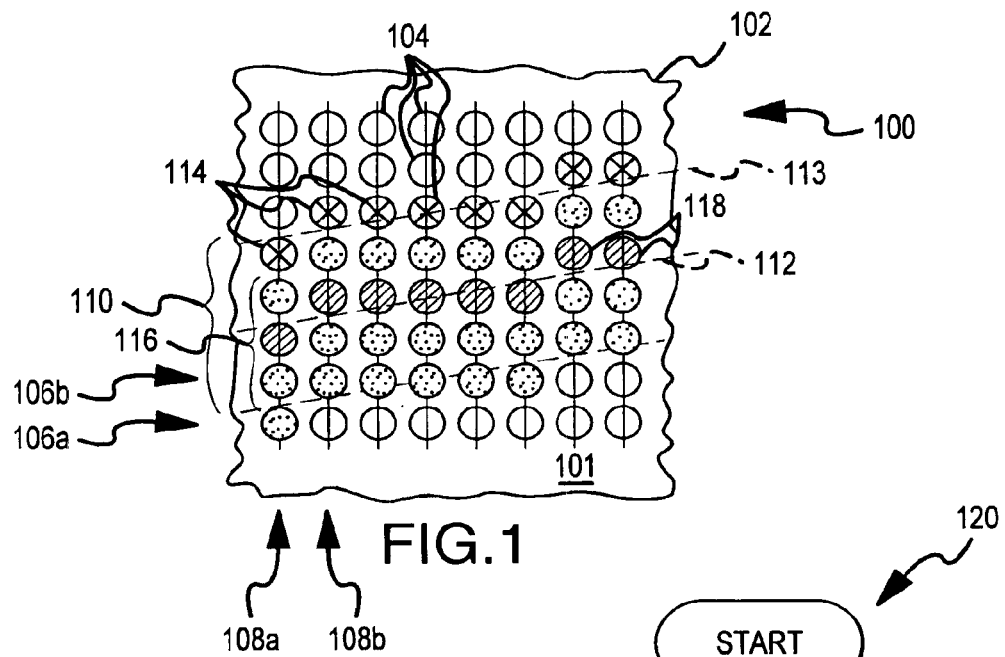
FIG. 1 is representation of a display on which a thick line is displayed.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 depicts a portion 102 of a display 100. Display screen 100 includes a plurality of display picture elements (pixels) 104 arranged in an array of rows 106a, 106b, etc. (collectively referred to as rows 106) and columns 108a, 108b, etc. (collectively referred to as columns 108). Display 100, as shown in FIG. 1, displays a portion of a thick graphic primitive 110 centered around an origin line 112. A thick primitive, as used in this disclosure and as defined by such industry standard interfaces for graphics hardware such as OpenGL, refers to a primitive with a thickness of greater than one pixel. Thick primitive 110 of FIG. 1 includes a plurality of boundary pixels 114, and for each boundary pixel 114, a set of adjacent pixels 116. The present invention contemplates a method of drawing thick primitive 110 that reduces execution time by minimizing the portion of the line drawing routine that uses a line drawing algorithm, which requires measurable setup and execution time, and thereby maximizing the portion of the routine that uses a highly efficient routine (such as a simple step and repeat algorithm) to draw adjacent pixels 116.

Origin line 112 is a representation, superimposed on pixel array 101, of the center line of the primitive to be drawn. The plurality of pixels indicated by reference numeral 118 represent the pixels that would be selected by a line drawing routine if the width of primitive 110 were 1 or 0. Typically, algorithms used to draw graphic primitives calculate one or more parameter values' during a set-up routine. These parameter values are then typically used in a repetitive fashion to draw each succeeding pixel of the graphic primitive. In the specific case when the graphic primitive is a line, a number of candidate algorithms are available to draw the graphic image in the display. Ideally, the line drawing algorithm that is ultimately invoked by the graphics system includes a highly efficient inner loop. An efficient inner loop is characterized by a minimum of floating point and other operations requiring multiple clock cycles to execute. In the preferred embodiment of the present invention, the algorithm invoked to draw a line is the Bresenham or a variant thereof. The Bresenham algorithm includes a setup portion in which certain parameter values required for using the algorithm are calculated and an inner loop in which the parameter values are used to select the pixels that best approximate the primitive. The Bresenham algorithm eliminates all multiplication and other floating point operations from its inner loop thereby resulting in a routine that is able to draw lines efficiently once the setup parameter values have been calculated. Despite the efficiency with which Bresenham and derivative algorithms execute, the setup time required to calculate the parameter values needed to use the algorithms could is preferably minimized or entirely avoided to the extent possible.

Thick primitives are defined by OpenGL and other graphics interface specifications as primitives that are greater than 1 pixel in thickness. A thick line, accordingly, is a represented as a composite of two or more parallel and adjacent single pixel lines. One approach to drawing such a primitive would be to treat it as simply a composite of multiple, single pixel primitives. Using this approach, a thick line, for example, could be rendered by invoking the Bresenham routine for each parallel single pixel line. While this approach offers the advantage of simplicity, invoking the set-up portion associated with any line drawing algorithm for each single pixel element of the thick primitive would undesirably impact performance. Especially in graphic systems where lines are allowed to begin and terminate at arbitrary locations (as opposed to graphic systems in which lines begin and terminate on grid points or integer values), the setup routine can require multiple complex calculations including floating point operations to produce the parameter values necessary to use the inner loop of the routine. The present invention contemplates a method of minimizing the set-up time associated with the rendering of thick primitives by taking advantage of the adjacency between the multiple primitive elements that comprise the thick primitive.

Figure 2:
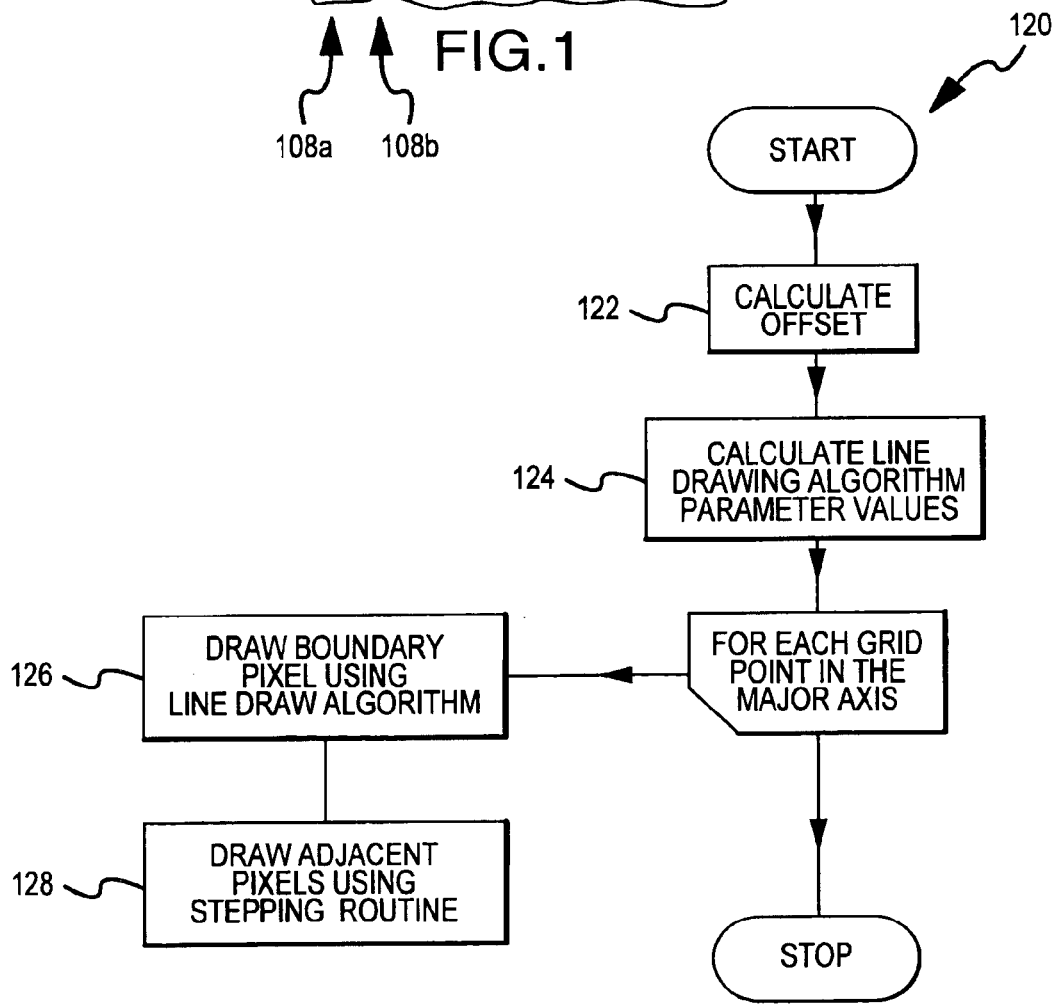
FIG. 2 is a flow diagram of a method drawing a thick primitive according to the present invention.

Turning now to FIG. 2, a flow chart representative of a method 120 of drawing thick primitives according to the invention is presented in conjunction with further discussion of the representation of display 100 depicted in FIG. 1. Conceptually, the method includes a process of creating a line that is parallel to and displaced in the minor axis direction from the origin line 112 and using this offset line as a starting point for a line drawing routine. (For lines with slopes between −1 and 1, the x-axis is the major axis and the y-axis is the minor axis). Accordingly, method 120 according to the present invention includes a step 122 in which an offset or displacement value is calculated. The offset or displacement represents the distance between origin line 112 and the offset line, identified in FIG. 1 by reference number 113. The displacement is a function of the primitive's thickness. In a presently preferred embodiment, the offset value, D, is approximately half of the thickness W of thick primitive 110. More specifically, D=FLOOR((W−1)/2) in one presently preferred embodiment of the invention. For the example primitive 110 depicted in FIG. 1, the thickness W is five (one boundary pixel 114 and four adjacent pixels 116) and, accordingly, the displacement D is equal to two.

Once the offset or displacement has been calculated in step 122, the set up portion of a line drawing algorithm is invoked to calculate line drawing parameters associated with the offset line 113 in step 124. In the preferred embodiment, the Bresenham line drawing algorithm or a derivative algorithm such as the midpoint line algorithm described in Foley, *Computer Graphics, Second Edition in C*, pp. 74–78 (1996), which is incorporated by reference herein, provides a suitable line drawing algorithm. An iterative process or loop that is repeated for each grid point in the major axis range of the offset line is then entered. (It is noted that the major axis range of offset line 113 and origin line 112 are the same). The iterative process includes a first step 126 in which a boundary pixel 114 is drawn using the chosen line drawing algorithm and the previously calculated line drawing parameters. After the boundary pixel 114 is drawn for a given major axis grid point coordinate, the adjacent pixels 116 are drawn in step 128 using a simple step routine in which the minor axis grid point coordinate is simply decremented or incremented (depending upon the sign of the slope) and a pixel is drawn at the new grid point coordinates. Step 128 is preferably repeated W−1 times to draw W−1 pixels adjacent to boundary pixel 114 and sharing a common major axis coordinate with boundary pixel 114.

It will be appreciated that, using method 120, the setup routine associated with the chosen line drawing algorithm is executed only a single time. The remaining elements of thick primitive 110 are selected and drawn based on their adjacency to the boundary pixel 114. Because the step function 128 involves only a simple arithmetic increment or decrement of a single variable, the execution time of step 128 is minimized to achieve optimum performance in the drawing of thick primitives.

Figure 3:
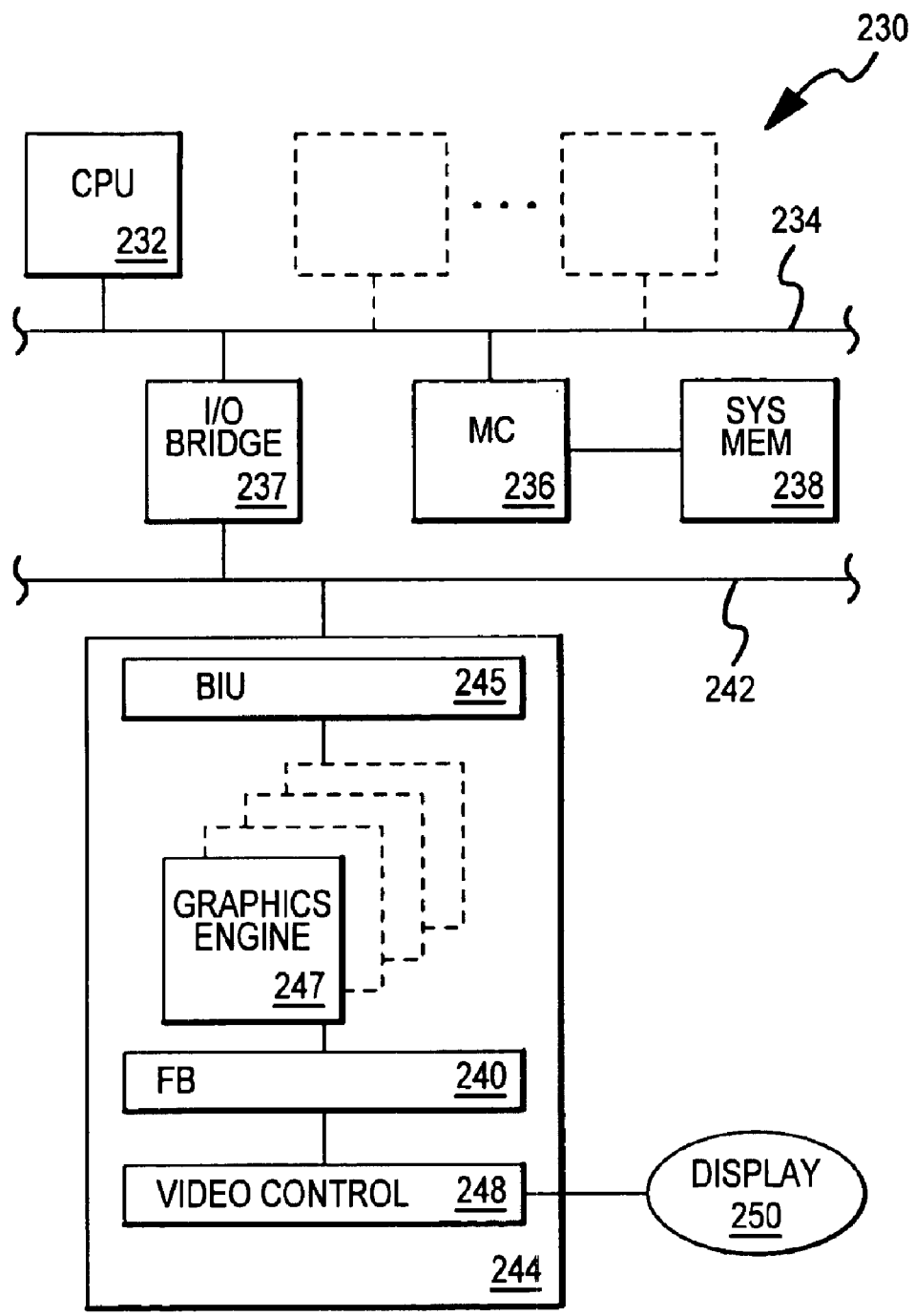
FIG. 3 is a simplified block diagram of a computer system including a graphics adapter according to the present invention.

Turning now to FIG. 3, a graphic display system 230 according to one embodiment of the invention is presented. Display system 230 preferably includes one or more processors 232 coupled to a processor or host bus 234. A memory controller 236 provides a path between host bus 234 and a system memory 238 while I/O bridge 237 provides a path between host bus 234 and an I/O bus 242. Processor 232 may comprise any of a variety of industry standard or application specific RISC or CISC chips and the current invention does not contemplate restricting the choice of processor 232 to any particular architectural implementation. Multi-processor embodiments of display system 230 are indicated by the presence of the additional processors shown in dashed lines. In one embodiment, peripheral bus 242 is a PCI bus or other bus suitable for supporting high performance graphics applications and hardware. A graphics adapter 244 according to the present invention is coupled to peripheral bus 242. Graphics adapter 244 preferably includes a bus interface unit 245 that permits graphics adapter 244 to communicate with host bus 234 via peripheral bus 242. In one embodiment, adapter 244 includes a video controller 248 that is coupled to a display device 250. Video controller 248 is configured to refresh display 250 with a graphic image stored in frame buffer 240. The various blocks or components of graphics adapter 244 indicated in FIG. 3 are functional blocks that may be integrated in a single integrated circuit device or implemented as two or more distinct devices. In one embodiment, graphics adapter 244 includes multiple graphics engines 247 adapted to operate in a parallel fashion to improve system performance. In one embodiment, adapter 244 may include four graphics engines 247 arranged wherein each engine operates on every fourth grid point of a graphic primitive. In the preferred embodiment, graphic engine 247 represents an application specific integrated circuit (ASIC) designed with dedicated and optimized circuitry or hardware for drawing thick graphic primitives in the manner described previously with respect to FIG. 2. In another embodiment, graphics engine 247 accomplishes the drawing of thick graphic primitives by executing a software routine stored in a storage medium such as system memory 238 or a local memory (not depicted) of graphics adapter 244. In alternative embodiments, the storage medium may include a hard disk coupled to peripheral bus 242, a CD ROM, a floppy diskette, a compact flash memory card or any other suitable storage medium. The thick primitive drawing method of the present invention may comprise an extension of an industry standard interface for graphics hardware such as the OpenGL standard or may be embedded within an application program.

It will be apparent to those skilled in the art having the benefit of this disclosure that the present invention contemplates a efficient and practical method and system for drawing thick graphic primitives. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of drawing a thick line, comprising:
    calculating a displacement D, wherein the displacement is a function of the line thickness W;
    using a line drawing algorithm to determine line drawing parameter values for a single offset line, wherein the offset line is parallel to an origin line and offset from the origin line in a minor axis direction by the displacement;
    for each major axis pixel coordinate of the offset line:
        selecting a boundary pixel having the major axis pixel coordinate and a first minor axis pixel coordinate determined using the line drawing algorithm;
        selecting a set of additional pixels adjacent to the boundary pixel, each having the major axis pixel coordinate, wherein the number of pixels in the set is a function of W; and
        setting each of the selected pixels for subsequent drawing.

2. The method of claim 1, wherein W is equal to the line thickness.

3. The method of claim 2, wherein the displacement D=FLOOR((W−1)/2).

4. The method of claim 1, wherein the line drawing algorithm comprises a midpoint line algorithm.

5. The method of claim 1, wherein the step of selecting W−1 additional pixels is independent of the line drawing parameters associated with the line drawing algorithm.

6. A computer system, comprising:
    a frame buffer comprised of an array of storage elements;
    a display comprised of an array of pixels corresponding to the array of storage elements in the frame buffer;
    a video controller adapted to produce an image on the display representative of the contents of the frame buffer; and
    a first graphics engine adapted to draw a thick line in the frame buffer by calculating line drawing parameter values for a single offset line and invoking a routine for each major axis pixel coordinate in the major axis range of the offset line where the routine draws a first pixel by invoking a line drawing algorithm and draws at least one additional pixel adjacent to the first pixel using a stepping routine;
    wherein the offset line is parallel to and displaced in the minor axis direction from a center line of the thick line.

7. The computer of claim 6, wherein the displacement of the offset line is a function of the thickness of the thick line.

8. The computer of claim 6, wherein the displacement D=FLOOR((W−1)/2), wherein W is the thickness of the thick line.

9. The computer of claim 6, wherein the line drawing algorithm is the midpoint line drawing algorithm.

10. The computer of claim 6, wherein the subroutine draws W−1 additional pixels, wherein W is the thickness of the thick line.

11. The computer of claim 6, further comprising at least one additional graphics engine in parallel with the first graphics engine, wherein the first graphics engine and the additional graphics engine each operate on a portion of the graphic primitive.

12. A graphics adapter, comprising:
    means for invoking a line drawing algorithm once at a major axis pixel coordinate to determine a first minor axis pixel coordinate and for selecting a first pixel defined by the major and minor axis coordinates; and
    means for invoking a stepping routine to select at least one additional pixel adjacent to the first pixel, wherein each additional pixel shares a common major axis pixel coordinate with the first pixel, and wherein the first pixel and the at least one additional pixel comprise one of a plurality of segments of a thick line.

13. The adapter of claim 12, wherein the first minor axis pixel coordinate corresponds to an offset line, wherein the offset line is parallel to and displaced in the minor axis direction from a center line of the thick primitive, and wherein the displacement is a function of the thickness of the thick line.

14. The adapter of claim 13, wherein the displacement D=FLOOR((W−1)/2), wherein W corresponds to the thickness of the thick line.

15. The adapter of claim 14 further comprising means for determining line drawing parameter values associated with the offset line.

16. The adapter of claim 12, wherein the line drawing algorithm comprises a midpoint line algorithm.

17. The adapter of claim 16, wherein the stepping routine selects W−1 additional pixels adjacent to the first pixel, wherein W corresponds to the thickness of the thick line.

* * * * *